United States Patent
Guo et al.

(10) Patent No.: US 9,349,407 B2
(45) Date of Patent: May 24, 2016

(54) DATA STORAGE MEDIUM SURFACE SMOOTHING METHOD AND ASSOCIATED APPARATUS

(75) Inventors: Xing-Cai Guo, Tracy, CA (US);
Thomas E. Karis, Aromas, CA (US);
Bruno Marchon, Palo Alto, CA (US);
Daryl J. Pocker, San Jose, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 180 days.

(21) Appl. No.: 13/323,638

(22) Filed: Dec. 12, 2011

(65) Prior Publication Data

US 2013/0146562 A1 Jun. 13, 2013

(51) Int. Cl.
*B44C 1/22* (2006.01)
*G11B 5/84* (2006.01)
*G11B 5/74* (2006.01)
*H01F 41/32* (2006.01)

(52) U.S. Cl.
CPC .............. *G11B 5/8408* (2013.01); *G11B 5/746* (2013.01); *H01F 41/32* (2013.01)

(58) Field of Classification Search
None
See application file for complete search history.

(56) References Cited

U.S. PATENT DOCUMENTS

| | | | |
|---|---|---|---|
| 6,168,845 B1 * | 1/2001 | Fontana, Jr. ............ | B82Y 10/00 204/192.2 |
| 6,295,164 B1 * | 9/2001 | Murakami et al. ............ | 359/584 |
| 7,247,251 B2 | 7/2007 | Hattori et al. | |
| 7,273,563 B2 | 9/2007 | Hattori et al. | |
| 7,413,819 B2 | 8/2008 | Hattori et al. | |
| 7,423,842 B2 | 9/2008 | Fujita et al. | |
| 2003/0224620 A1 * | 12/2003 | Kools et al. ............ | 438/776 |
| 2005/0089725 A1 | 4/2005 | Takai et al. | |
| 2005/0150758 A1 * | 7/2005 | Yakshin et al. ........... | 204/192.12 |
| 2005/0181239 A1 | 8/2005 | Ma et al. | |
| 2006/0043317 A1 * | 3/2006 | Ono et al. ................ | 250/492.21 |
| 2006/0278611 A1 | 12/2006 | Sato et al. | |
| 2006/0292400 A1 | 12/2006 | Suwa et al. | |
| 2007/0031705 A1 | 2/2007 | Hattori et al. | |
| 2007/0087227 A1 | 4/2007 | Ma et al. | |

(Continued)

FOREIGN PATENT DOCUMENTS

| DE | 3027162 A | 2/1981 |
|---|---|---|
| JP | 10050544 A | 2/1998 |

OTHER PUBLICATIONS

Weisstein, Angle of Incidence, 2007, Scienceworld, p. 1.*
Bhushan et al, Tribological properties of polished diamond films, Sep. 15, 1993, J. Appl. Phys., 74 (6), p. 4174-4180.*

(Continued)

*Primary Examiner* — Binh X Tran
*Assistant Examiner* — David Cathey, Jr.
(74) *Attorney, Agent, or Firm* — Kunzler Law Group, PC

(57) ABSTRACT

A method for smoothing a medium includes depositing a magnetic layer onto a base, depositing an overcoat layer onto an outer surface of the magnetic layer, and burnishing an outer surface of the overcoat layer. Further, the method includes at least one of (i) directing a first ion beam comprised of first energetic ions toward the outer surface of the magnetic layer at a first shallow grazing angle and smoothing the outer surface of the magnetic layer via etching engagement between the first ion beam and the outer surface of the magnetic layer; and (ii) directing a second ion beam comprised of second energetic ions toward the outer surface of the overcoat layer at a second shallow grazing angle and smoothing the outer surface of the overcoat layer via etching engagement between the second angled ion beam and the outer surface of the overcoat layer.

10 Claims, 7 Drawing Sheets

(56) References Cited

U.S. PATENT DOCUMENTS

2008/0141523 A1\* 6/2008 Bandic et al. .............. 29/603.13
2010/0207041 A1  8/2010 Sato et al.
2010/0230616 A1  9/2010 Suzuki et al.

OTHER PUBLICATIONS

S. Kakuta et al., "Low Damage Smoothing of Magnetic Materials Using Off-Normal Gas Cluster Ion Beam Irradiation" Surface & Coatings Technology 201, 8632-8636, Mar. 13, 2007.

\* cited by examiner

DATA STORAGE MEDIUM SURFACE SMOOTHING METHOD AND ASSOCIATED APPARATUS

FIELD

This disclosure relates to the manufacture of data storage media, and more specifically to smoothing surfaces of data storage media.

BACKGROUND

Magnetic storage media is used in a variety of technologies for providing storage of data, processing, and other functionality to electronic and magnetic devices. Patterning and non-patterning techniques are employed to spatially define features having different electrical or magnetic properties. Moreover, various patterning and non-patterning techniques are used as part of the fabrication process for building a wide variety of semiconductor and magnetic patterned media.

Patterned or spatially defined features in magnetic data storage media are used for storing digital data that can be erased and rewritten. Magnetic data storage media can be used in memory devices, such as MRAM and magnetic logic, and is being developed for use in storage devices, such as disk or tape drives. Generally, magnetic media on a disk or tape substrate can be referred to as either bit-patterned or non-patterned magnetic media. In bit-patterned magnetic media for storage devices, some of the patterned features are designed as storage elements of digital bits of data and other patterned features are designed for functions, such as providing servo information to position a read/write head.

Several techniques are known for patterning bit-patterned magnetic media. Prior techniques relied on an etching process for forming the patterns of storage elements in data storage media. However, such techniques required the planarization of the etched disk, which can result in increased cost and labor, as well as a reduction in yield. Accordingly, recently there has been a desire to develop certain techniques to mitigate the shortcomings of etching-based processes. For example, masked ion-beam and masked plasma immersion ion implantation lithography has proven to be an efficient alternative for producing patterned media.

Similar to patterned magnetic media, electronic devices, such as semiconductor data storage devices, utilize etching and ion implantation techniques for forming a pattern of doped regions in a medium. In the case of implanted ions, the energized ions cause the electrical properties of the doped regions in the medium to change from an initial value of the medium (e.g., semiconductor medium), thereby leaving un-doped regions covered by the hard mask between the doped regions.

Although known techniques for forming data storage media provide some advantages, such techniques also introduce certain disadvantages. For example, current techniques for forming patterned media, such as perpendicular magnetic recording media or thermal assisted recording media, results in a relatively high surface roughness of the media compared to past techniques, such as those associated with longitudinal magnetic recording media. Increased surface roughness may lead to non-uniform overcoat or top layer coverage, increased magnetic spacing in the case of magnetic media, and various flyability issues associated with data storage devices. To reduce surface roughness of finished data storage media (e.g., disk), conventional techniques employ a burnishing process to smooth the surface of the media. However, burnishing may introduce scratches and increase the risk of humidity-induced corrosion on the surfaces of the media, particularly with perpendicular recording media or thermal assisted recording media, which are known to have a significantly high final surface roughness. Other approaches for reducing surface roughness of data storage media include etching non-magnetic filler layers within the media, etching a substrate of the media prior to deposition of a magnetic layer and overcoat layer, and etching a surface of the data storage media at a normal angle relative to the surface of the media.

SUMMARY

The subject matter of the present application has been developed in response to the present state of the art, and in particular, in response to the surface roughness problems and needs in the art that have not yet been fully solved by currently available data storage medium manufacturing methods and apparatus. Accordingly, the subject matter of the present application has been developed to provide a process, and associated apparatus, for making data storage media that overcomes at least some shortcomings of the prior art. For example, the method and apparatus of the present application is configured to smooth the rough surfaces of various magnetic and semiconductor data storage media in a manner that reduces the occurrence of scratches and corrosion commonly associated with burnishing. In certain embodiments, the method and apparatus smoothes an intermediate layer of a data storage medium prior to the application of a top layer (e.g., overcoat layer) onto the intermediate layer such that the top layer is correspondingly smoother. In the same or alternative embodiments, the method and apparatus smoothes an outermost surface of the top layer after the top layer is applied onto bottom or intermediate layers of the medium or disk (e.g., after the medium or disk is finished). Generally, the method and apparatus of the present disclosure directs a beam of energetic ions onto a surface to be smoothed at a shallow grazing angle relative to the surface to effectively ion mill the surface from a relatively rough surface into a relative smooth surface.

According to one embodiment, a method for smoothing a magnetic recording medium includes depositing a magnetic layer onto a base and depositing an overcoat layer onto an outer surface of the magnetic layer. The method also includes burnishing an outer surface of the overcoat layer. In certain implementations, prior to burnishing the overcoat layer, a lubricant can be applied to the outer surface of the overcoat layer. Further, the method includes at least one of (i) directing a first ion beam comprised of first energetic ions toward the outer surface of the magnetic layer at a first shallow grazing angle and smoothing the outer surface of the magnetic layer via etching engagement between the first angled ion beam and the outer surface of the magnetic layer; and (ii) directing a second ion beam comprised of second energetic ions toward the outer surface of the overcoat layer at a second shallow grazing angle and smoothing the outer surface of the overcoat layer via etching engagement between the second angled ion beam and the outer surface of the overcoat layer.

In some implementations, the method includes directing the first ion beam comprised of first energetic ions toward the outer surface of the magnetic layer at the first shallow grazing angle and smoothing the outer surface of the magnetic layer via etching engagement between the first angled ion beam and the outer surface of the magnetic layer. In some implementations, the method includes directing the second ion beam comprised of second energetic ions toward the outer surface of the overcoat layer at the second shallow grazing angle and smoothing the outer surface of the overcoat layer via etching engagement between the second angled ion beam and the outer surface of the overcoat layer. In yet some implementations, the method includes both (i) directing the first ion beam comprised of first energetic ions toward the outer surface of the magnetic layer at the first shallow grazing angle and smoothing the outer surface of the magnetic layer via etching engagement between the first angled ion beam and the outer surface of the magnetic layer; and (ii) directing the second ion beam comprised of second energetic ions toward the outer surface of the overcoat layer at the second shallow grazing angle and smoothing the outer surface of the overcoat layer via etching engagement between the second angled ion beam and the outer surface of the overcoat layer. In certain implementations, the action of burnishing (and, in some implementations, lubricating) the outer surface of the overcoat layer occurs after the at least one of (i) directing the first ion beam comprised of first energetic ions toward the outer surface of the magnetic layer; and (ii) directing the second ion beam comprised of second energetic ions toward the outer surface of the overcoat layer.

According to some implementations, each of the first and second shallow grazing angles is between about 1° and about 35°. In certain implementations, each of the first and second shallow grazing angles is between about 10° and about 20°. The first shallow grazing angle can be different than the second shallow grazing angle.

In yet some implementations, each of the first and second energetic ions are energized to a kinetic energy between about 100 eV and about 3,000 eV. The kinetic energy of the first energetic ions can be different than the energy of the second energetic ions.

In some implementations, the first ion beam is directed toward the outer surface of the magnetic layer for a first time period and the second ion beam is directed toward the outer surface of the overcoat layer for a second time period. Each of the first and second time periods is between about one and ten minutes. The first time period can be different than the second time period.

According to another embodiment, an apparatus for smoothing a magnetic recording medium includes a magnetic layer deposition device that is configured to deposit a magnetic layer onto a base of the magnetic recording medium. The apparatus also includes an overcoat layer deposition device that is configured to deposit an overcoat layer onto the magnetic layer of the magnetic recording medium. Further, the apparatus includes an ion gun that is configured to generate an ion beam comprised of energetic ions and direct the ion beam toward the magnetic recording medium at a shallow grazing angle less than about 35°. The ion gun is operable in a first mode to direct a first ion beam toward a magnetic layer of the magnetic recording medium prior to deposition of an overcoat layer onto the magnetic layer to smooth an outer surface of the magnetic layer. The ion gun is also operable in a second mode to direct a second ion beam toward an overcoat layer deposited onto a magnetic layer of the magnetic recording medium to smooth an outer surface of the overcoat layer. The apparatus additionally includes a burnishing device configured to burnish an outer surface of an overcoat layer of the magnetic recording medium after the overcoat layer is deposited onto a magnetic layer of the magnetic recording medium. Additionally, the apparatus may include a lubricating device for lubricating the surface of the overcoat layer prior to burnishing.

In some implementations of the apparatus, the first ion beam is defined by a first type of energetic ions and a first shallow grazing angle, and the second ion beam is defined by a second type of energetic ions and a second shallow grazing angle. At least one of the first type of energetic ions and first shallow grazing angle is different than the respective second type of energetic ions and second shallow grazing angle. The apparatus also includes a control module that is configured to automatically select a shallow grazing angle, an ion species of the energetic ions, an energy level of the energetic ions, and an ion beam generation time period of the ion source based on at least one of an initial surface roughness of the surface to be smoothed, a desired final surface roughness of the surface to be smoothed, and a material type of the surface to be smoothed.

In yet another embodiment, a method for smoothing a magnetic layer of a magnetic recording medium includes providing a base and depositing a magnetic layer onto the base. The method also includes directing an ion beam made from energetic ions toward the outer surface of the deposited magnetic layer at a shallow grazing angle of less than about 35° to smooth the outer surface of the deposited magnetic layer via etching engagement between the angled ion beam and the outer surface of the deposited magnetic layer. Further, the method includes depositing an overcoat layer onto the smoothed outer surface of the deposited magnetic layer. Additionally, the method includes burnishing an outer surface of the deposited overcoat layer. In certain implementations, the method may also include lubricating the outer surface of the deposited overcoat layer prior to burnishing the overcoat layer. The energetic ions can be energized to between about 100 eV and about 3,000 eV.

In another embodiment, a method for smoothing an overcoat layer of a magnetic recording medium includes providing a base, depositing a magnetic layer onto the base, and depositing an overcoat layer onto the deposited magnetic layer. The method also includes directing an ion beam made from energetic ions toward the outer surface of the deposited overcoat layer at a shallow grazing angle of less than about 35° to smooth the outer surface of the deposited overcoat layer via etching engagement between the angled ion beam and the outer surface of the deposited overcoat layer. Additionally, the method includes burnishing an outer surface of the deposited overcoat layer. In certain implementations, the method may also include lubricating the outer surface of the deposited overcoat layer prior to burnishing the overcoat layer. The energetic ions can be energized to between about 100 eV and about 3,000 eV.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
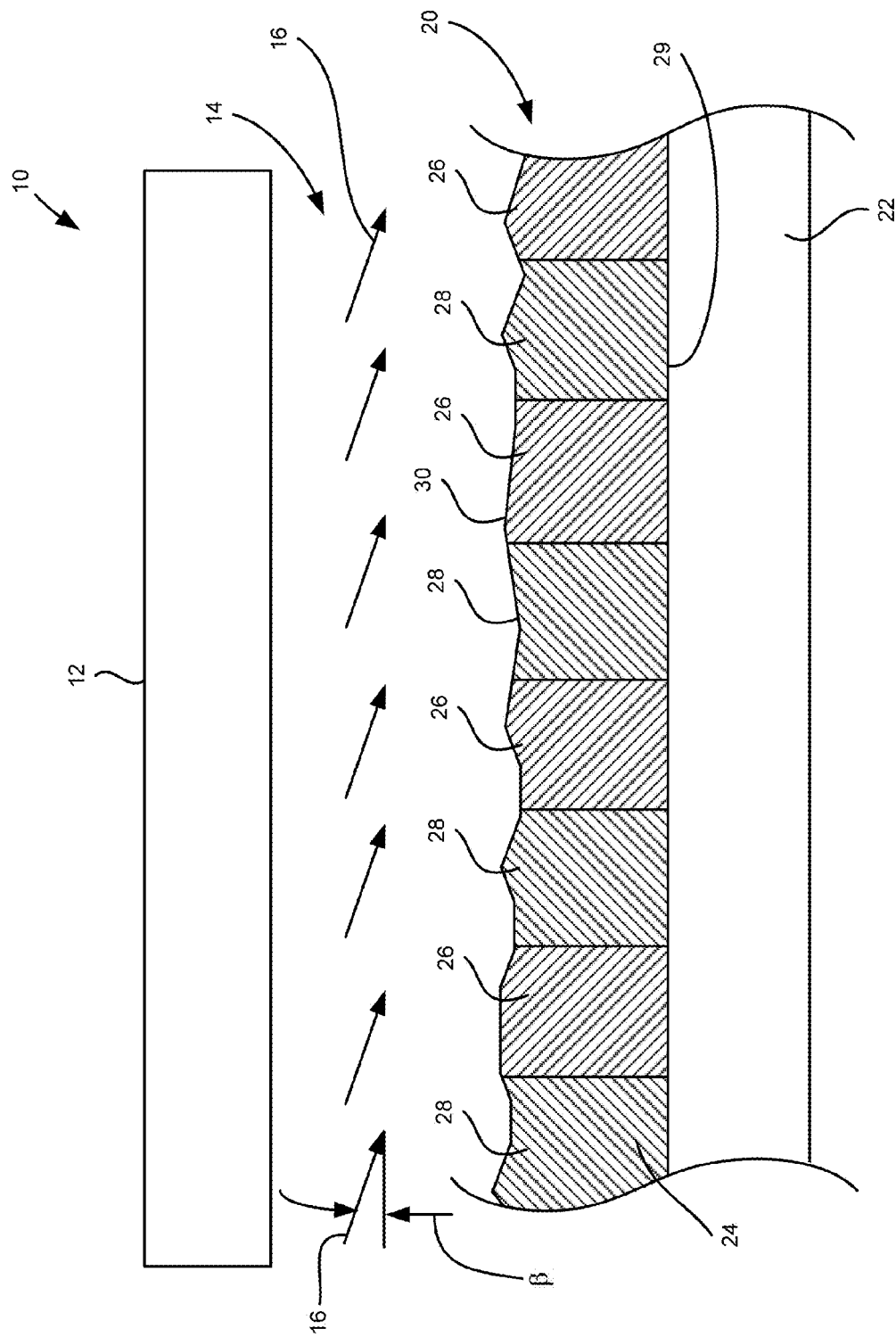
FIG. 1 is a schematic cross-sectional illustration of one embodiment of an apparatus for smoothing a surface of a magnetic layer of a magnetic recording medium.

According to FIG. 1, one embodiment of an apparatus 10 for smoothing a patterned magnetic medium 20 is shown. The apparatus 10 includes an ion beam generator or gun 12. The ion beam generator 12 is configured to generate or produce an ion beam 14 made of a plurality of channeled energized ions 16. The ion beam 14, including each of the energized ions 16, is channeled in a desired direction relative to a surface of the medium 20 to be smoothed. As shown, the ion beam 14 is directed toward the medium 20 at a grazing or incidence angle β defined as the angle formed between the ion beam 14 (e.g., approximately each energized ion 16) and a line 18 extending substantially parallel to the macro-scale surface of the medium 20 to be smoothed. Accordingly, the grazing angle β is defined as the angle formed between the ion beam 14 and the macro-scale surface of the medium 20 to be smoothed.

When finished, the patterned magnetic medium 20 can be a component of a magnetic memory device, such as a hard drive, magnetoresistive random access memory (MRAM) device, and the like. As shown, the patterned magnetic medium 20 includes a base 22 and a magnetic layer 24. Although not shown, the apparatus 10 may include a base module configured to form the base 22. The magnetic layer 24 is formed on (e.g., applied or coated on) the base 22.

Although not shown in detail, the base 22 includes a substrate and, in certain implementations, at least one intermediate layer positioned between the substrate and the magnetic layer 24. The substrate can be made from any of various electrically insulated or non-conductive materials, such as, for example aluminum, aluminum alloys, polymers, paper, glass, glass composites, magnesium alloys, ceramics, silicon, silicon wafers coated with one or more material layers, or other materials commonly used in the art. In certain implementations, the substrate is a flexible tape substrate. In other implementations, the substrate is a hard disk substrate. Preferably, the base 22 includes at least one intermediate layer deposited onto the substrate and configured to promote certain characteristics of the medium 20 (e.g., to control the size and orientation of the magnetic crystal grains in the magnetic layer 24). For example, in one implementation, the base 22 includes an NiP coating layer atop the substrate. In some implementations, the base includes one or more of a soft magnetic underlayer, an interlayer, and an exchange break layer positioned between the substrate and the magnetic layer 24.

The magnetic layer 24 is a relatively thin film made from a magnetic material, such as, for example, any of various ferromagnetic materials, iron, cobalt, cobalt, chromium, platinum, palladium, nickel, alloys of the same (e.g., alloys including oxygen, boron, silicon, carbon, and the like), or other materials commonly used in the art. The magnetic layer 24 can be patterned or non-patterned. For patterned magnetic layers 24, such as with perpendicular magnetic recording media and thermal assisted recording media, a plurality of magnetic bits or domains 26 are formed in the magnetic layer 24 between a plurality of non-magnetic domains or islands 28. Although the patterned magnetic medium 20 shown in FIG. 1 includes a single magnetic layer 24 applied to a top surface of the base 22, in other embodiments, the medium 20 is a two-sided disk with an additional magnetic layer applied to a bottom surface of the base opposite the top surface. As is known in the art, the medium 20 is usable in a magnetic recording device having a read/write head that reads information from the magnetic bits based on the orientation of the magnetic grains of the bits, and writes information to the medium by orienting the grains of the bits.

The magnetic bit pattern of the magnetic layer 24 can be formed using any of various techniques know in the art. In one embodiment, the bit pattern is formed by application of a patterned hard mask layer onto the magnetic layer 24, and implanting ions into the portions of the magnetic layer exposed through apertures in the hard mask to form the non-magnetic domains 28. After forming the non-magnetic domains 28, the hard mask is removed to expose and allow access to the magnetic bits 26. In other embodiments, the bit pattern is formed in the magnetic layer 24 using other known techniques, such as etching and/or plasma-assisted processes.

Figure 3:
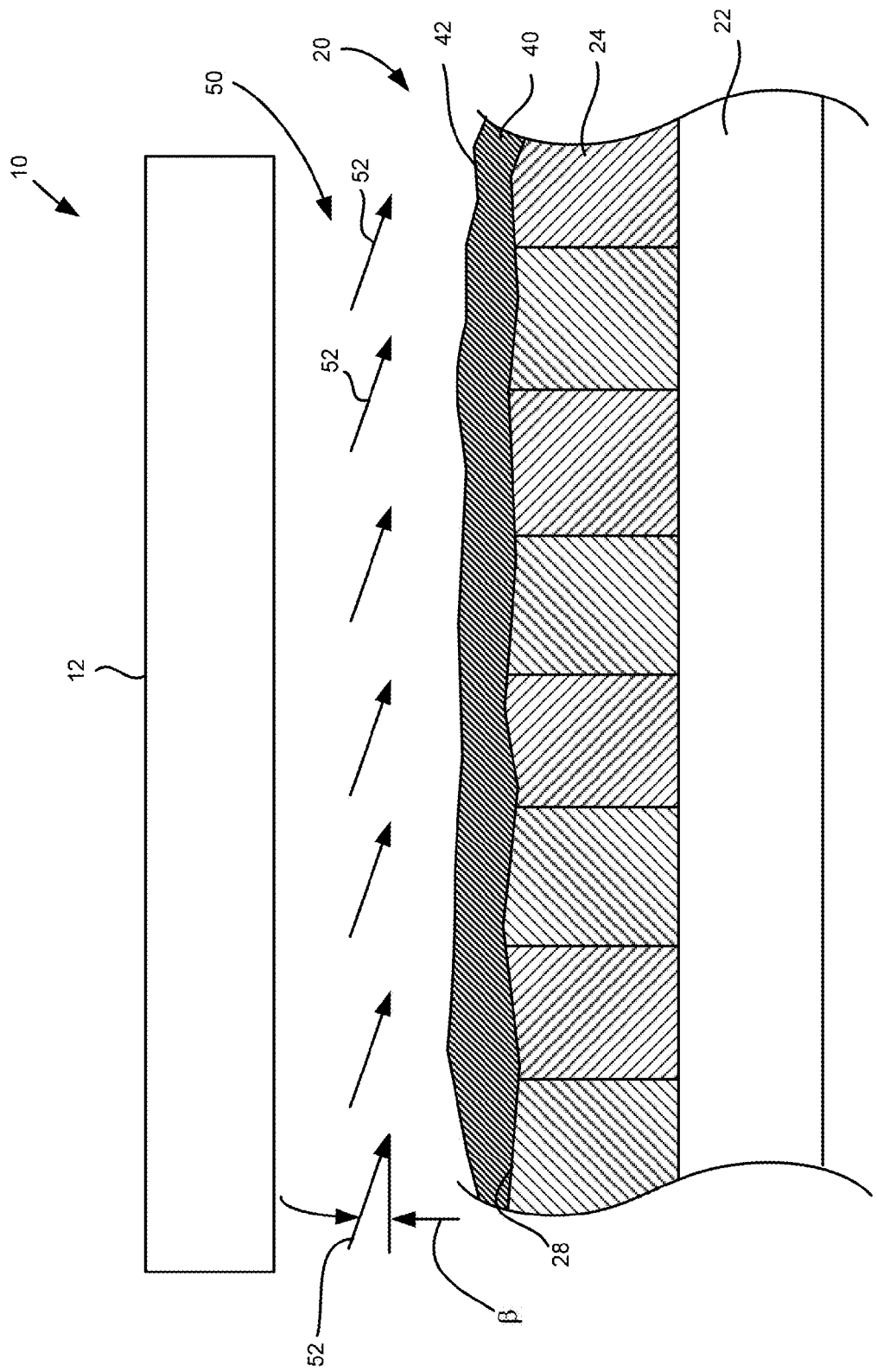
FIG. 3 is a schematic cross-sectional illustration of one embodiment of an apparatus for smoothing a surface of an overcoat layer of a magnetic recording medium.

Regardless of the process implemented for forming the magnetic bit patterns in the magnetic layer 24, the top or outer surface 30 of the finished magnetic layer, particularly with perpendicular magnetic recording media and thermal assisted recording medium, will likely be significantly rough as shown in FIG. 1. As shown in FIG. 3, following formation of the magnetic layer 24, an overcoat layer 40 is applied to the magnetic layer 24 to protect the magnetic layer from wear (e.g., abrasions and environmental corrosion), as well as to provide at least some impact shock resistance and vibration resistance for the magnetic layer. Although not shown, the apparatus 10 may include an overcoat module configured to deposit an overcoat layer onto the magnetic layer 24 or an intervening layer. Generally, an outer surface 42 of the overcoat layer 40 has a roughness corresponding with the roughness of the outer surface 30 of the magnetic layer 24. However, higher surface roughness of the magnetic layer 24 commonly associated with perpendicular magnetic recording media and thermal assisted recording media, among other types of media, may lead to non-uniform coverage of the overcoat layer. Non-uniform overcoat layer coverage tends to produce portions of the overcoat layer with a reduced thickness and portions with an increased thickness. Concerning magnetic storage media, the reduced thickness portions weaken the ability of the overcoat layer to protect the magnetic layer. In contrast, the increased thickness portions increase the magnetic spacing between the read/write head and the magnetic layer 24. Therefore, it may be desirable to reduce the roughness of the magnetic layer 24 prior to application of the overcoat layer 40 to ensure more uniform overcoat coverage.

As mentioned above, the overcoat layer 40 is exposed to the read/write head of a magnetic storage device in which the magnetic storage medium 20 is implemented. Accordingly, the surface roughness of the outer surface 42 of the overcoat layer 40 directly impacts the flyability of the read/write head over the medium 20. In other words, the higher the surface roughness of the overcoat layer, the more susceptible the read/write head is to negatively contacting the outer surface of the overcoat layer. Accordingly, it may be desirable to reduce the surface roughness of the overcoat layer 24 to maintain the flyability of the read/write head over the overcoat layer 40.

As discussed above, conventional processes for forming magnetic recording media often include a burnishing step, which is designed to at least partially smooth the outer surface of the overcoat layer. Although not shown, the apparatus 10 may include a burnishing device configured to burnish an outer surface of an overcoat layer of a finished magnetic recording medium. However, should the surface roughness of the overcoat layer 40 be too high, such as with some perpendicular magnetic recording media and thermal assisted recording media, the burnishing process may actually harm the medium 20 by scratching and promoting corrosion of the medium. Therefore, it may be desirable to reduce the surface roughness of the overcoat layer 24 prior to burnishing the medium 20 to reduce the likelihood of the burnishing process damaging to the medium.

Because the surface roughness of an unfinished overcoat layer 40 corresponds with the surface roughness of the magnetic layer 24, the surface roughness of the overcoat layer 40 can be reduced by first reducing the surface roughness of the magnetic layer 24. Further, reducing the surface roughness of the magnetic layer 24 can promote more uniform coverage of the overcoat layer 40 on the magnetic layer. Accordingly, according to one embodiment, the apparatus 10 is configured to smooth the surface roughness of the magnetic layer 24 prior to applying an overcoat layer. In this manner, the overcoat layer applied to the magnetic layer 24 has a reduced surface roughness and more uniform coverage.

The apparatus 10 smoothes the surface 28 of the magnetic layer 24 directly by shooting the ion beam 14 at the magnetic layer 24 at a designated grazing angle $\beta$ for a designated time period. The ion beam 14 directly impacts the outer surface 28 of the magnetic layer 24, as opposed to a substrate layer below the magnetic layer or some non-magnetic filler layer deposited below or above the magnetic layer. In the context of FIG. 1, the grazing angle $\beta$ can be defined as the angle formed between the ion beam 14 and the macro-scale surface 28 of the magnetic layer 24. The ion beam 14 generated by the ion beam generator 12 is made up of a plurality of energized ions 16 of a selected species, selected kinetic energy, and selected doping rate (e.g., ion amount). The grazing angle $\beta$, time period, ion species, ion doping rate, and ion kinetic energy of the apparatus 10 are selected or determined based on at least the initial surface roughness of the layer to be smoothed (e.g., the magnetic layer 24 in FIG. 1 and the overcoat layer 40 in FIG. 3), the type of material or materials forming the layer to be smoothed, the desired final surface roughness of the smoothed layer, and any of various manufacturing constraints and milling efficiency factors (e.g., production times, costs, material types, etc.). In one particular implementation, the most heavily weighted factors in determining the characteristics of the ion beam include the desired final surface roughness and the overall milling time (e.g., manufacturing throughput).

The apparatus 10 can be adjustable to adjust one or more of the grazing angle $\beta$, time period, ion species, ion doping rate, and ion kinetic energy as needed. In some implementations, the apparatus 10 is controlled and adjustable via a control module (e.g., a computer or other electronic device) operable by a user. The control module may be configured to automatically determine the designated grazing angle $\beta$, time period, ion species, ion doping rate, and ion energy based on user input (e.g., type of medium, production model, initial surface roughness, desired final surface roughness, etc.), and set the apparatus 10 accordingly.

The impact force of the energetic ions 16 on the outer surface 28 of the magnetic layer 24 causes micro-scaled portions of the magnetic layer to become dislodged from the surface. Through continuous bombardment of energetic ions onto the outer surface 28 over time, a sufficient amount of micro-scaled portions are removed to effect a reduction in the surface roughness of the outer surface. However, unlike substrate layers, non-magnetic filler layers, and other non-magnetic layers, whose final thickness need not be accurately controlled, the final thickness of the magnetic layer 24 is critical for proper data read/write operations on the medium 20. Therefore, the removal of material from the outer surface 28 of the magnetic layer 24 requires accurate control in order to both smooth the outer surface of the magnetic layer (e.g., removing asperities from the surface) and maintain the thickness of the magnetic layer within a workable range associated with proper operation of the medium.

The designated grazing angle β can be any of various acute angles. Preferably, however, the grazing angle β is a substantially shallow angle between about 1° and about 35°. Shallow angles between about 1° and about 35° are preferred because at shallow angles, the energetic ions impact and reduce the height of the peaks on the outer surface 28, while substantially avoiding impact with and an increase in depth of the valleys on the outer surface. In this manner, exposing the outer surface 28 of the magnetic layer 24 to an ion beam 14 at a shallow grazing angle for a designated period of time reduces the surface roughness of the outer surface by reducing the heights of the peaks and leaving the depths of the valleys relatively unchanged. Accordingly, in certain implementations, two factors in selecting a proper grazing angle β include the initial surface roughness and desired final surface roughness. For example, the higher the initial surface roughness, the higher the designated grazing angle β. In contrast, the lower the desired final surface roughness, the lower the designated grazing angle β. In one specific implementation, the grazing angle β is between about 10° and about 20°. In yet certain implementations, the grazing angle β is about 14°.

Generally, the ion beam 14 is applied to the outer surface 28 of the magnetic layer 24 at the designated grazing angle β for a period of time sufficient to reduce the height of the peaks on the surface relative to the depth of the valleys on the surface such that the overall surface roughness of the outer surface meets the desired final surface roughness and desired thickness of the magnetic layer. In certain implementations, the desired minimum thickness of the magnetic layer 24 is approximately equal to or greater than the distance between a bottom surface 29 of the magnetic layer and the valleys of the outer surface 28. Accordingly, depletion of the valleys (i.e., increase in depth of the valleys) due to ion bombardment of the valleys is undesirable. Therefore, in addition to controlling the grazing angle β, the amount of time spent bombarding the outer surface 28 with energetic ions 16 can be controlled to ensure that a desire amount of the peaks are removed without affecting the valleys. Generally, the surface roughness of the outer surface 28 of the magnetic layer 24 progressively decreases with increased ion milling time. However, at some time threshold of continuous ion milling, the energetic ions will start impacting and increasing the depth of the valleys, and in some cases actually result in an increase in the surface roughness. The designated time period during which the energetic ions 16 are directed at the magnetic layer 24 can then be selected to be more than some minimum time period, but less than the time threshold. In some implementations, the designated time period is between about one second and about ten minutes. Generally, in certain implementations, the designated time period desirably is minimized to increase manufacturing throughput. The designated time period can be reduced by adjusting (e.g., increasing) the grazing angle, ion energy level, and ion doping rate.

The ion beam 14 can be made from energized ions 16 of any of various species depending on one or more factors associated with milling efficiency, such as, for example, user input, grazing angle β, ion milling time period, ion doping rate, and energy level of ions. In certain implementations, the ions 16 are made up of inert gas ion species, such as, for example, neon, argon, krypton, xenon, and the like. In other implementations, the ions 16 are made up of reactive gas ion species, such as, for example, oxygen, carbon dioxide, and the like. The type of ion species may also be selected based on the mass of the species. The higher mass species, such as krypton and xenon, are effective at removing larger amounts of the magnetic layer 24 in shorter amounts of time. Accordingly, higher mass species may be used in applications where manufacturing time is a concern. In contrast, lower mass species, such as oxygen, neon, and argon, remove smaller amounts of the magnetic layer 24, but are effective where manufacturing time is less of a concern than precision and accuracy.

The kinetic energy level of the energized ions 16 is controllable via operation of the ion gun 12 to promote a desirable milling efficiency. Generally, higher energy ions 16 remove more material than lower energy ions. However, control over higher energy ions may be less precise than lower energy ions. In certain implementations, the ion beam kinetic energy can be between about 100 electron volts (eV) and 3,000 eV. In some implementations, the ion beam kinetic energy can be between about 600 eV and 3,000 eV. In one specific implementation, the ion beam kinetic energy is about 2,500 eV. Further, the ion doping rate of the ion beam is controllable via operation of the ion gun 12 to promote a desirable milling efficiency.

In some implementations, the desirable grazing angle β, time period, ion species, ion doping rate, and ion kinetic energy for a given medium are determined through an iterative process of measuring surface roughness after a certain time period of ion milling and adjusting the characteristics of the ion beam accordingly to accomplish a desirable milling efficiency. According to one particular implementation, the ion gun 12 is configured to direct an ion beam 14 made up of Krypton ions energized at 2,500 eV toward an outer surface 28 of a magnetic layer 24 of a perpendicular magnetic medium at a grazing angle β of 14°. A physical embodiment of the ion gun 12 of this particular implementation was constructed and tested. The physical gun 12 bombarded the outer surface 28 of the magnetic layer 24 with the specifically configured ion beam for an ion milling period of 10 minutes.

Figure 5:
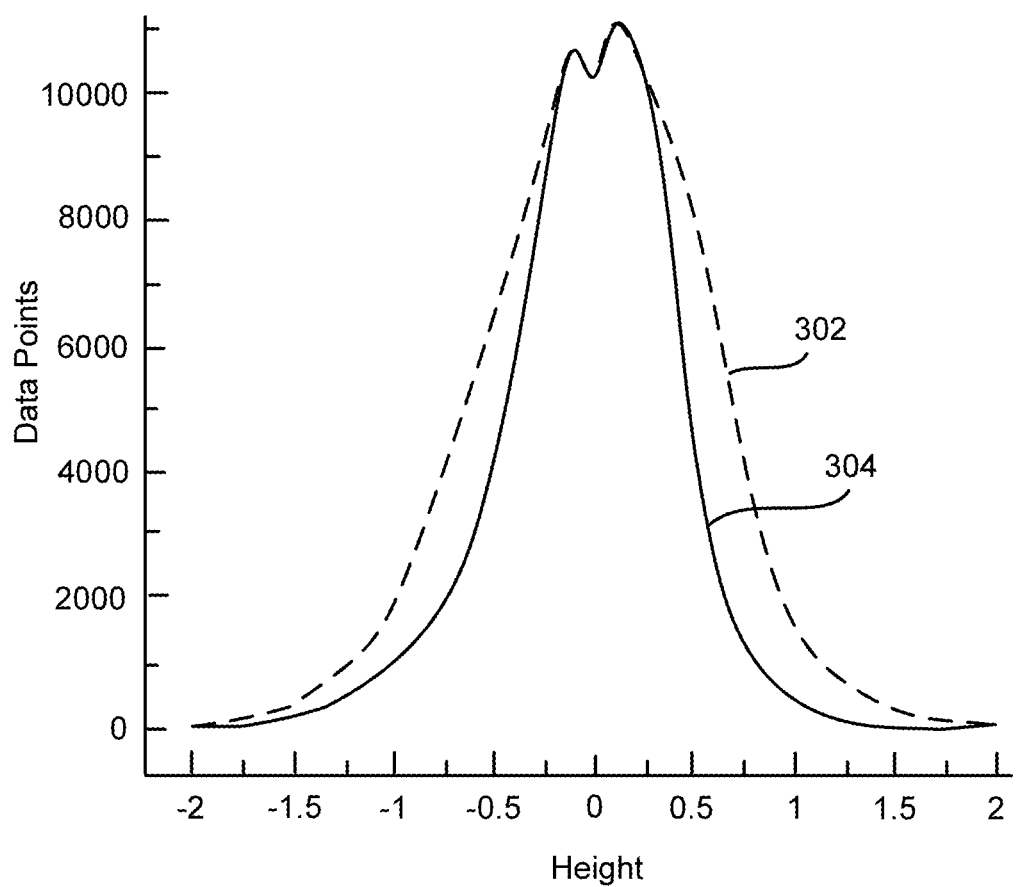
FIG. 5 is a graph comparing surface topography values with the number of data points examined for smoothed and unsmoothed surfaces according to one embodiment.
Figure 7:
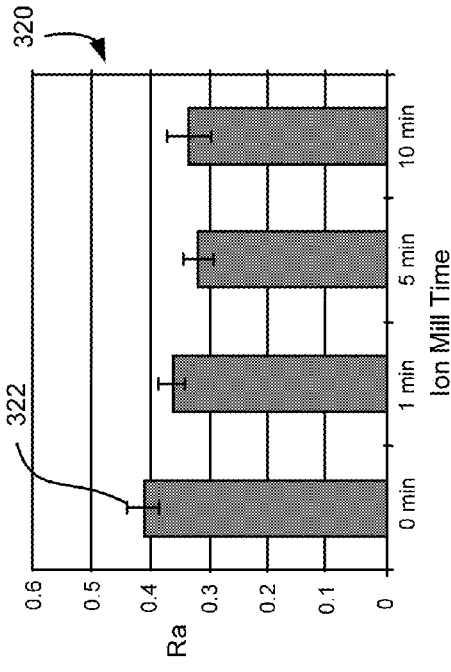
FIG. 7 is a graph comparing mean roughness values with ion milling time according to one embodiment.
Figure 9:
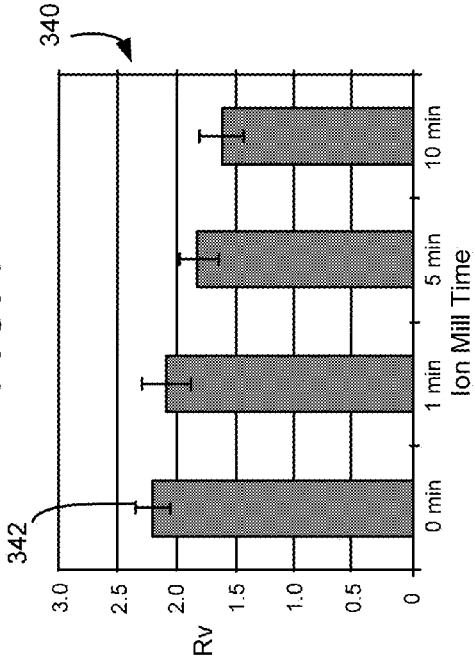
FIG. 9 is a graph comparing maximum valley depth values with ion milling time according to one embodiment.
Figure 6:
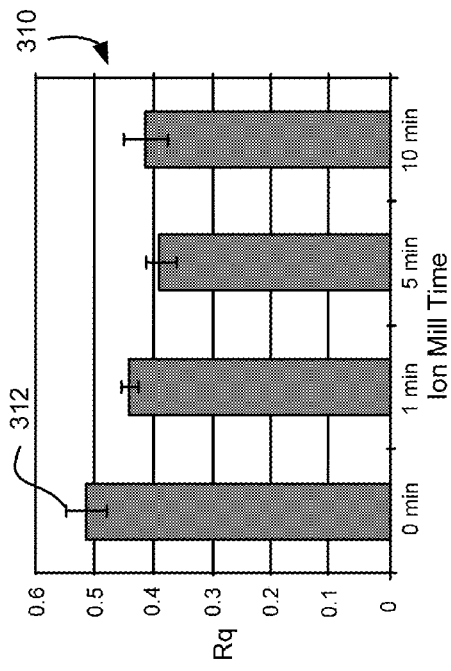
FIG. 6 is a graph comparing RMS roughness values with ion milling time according to one embodiment.
Figure 8:
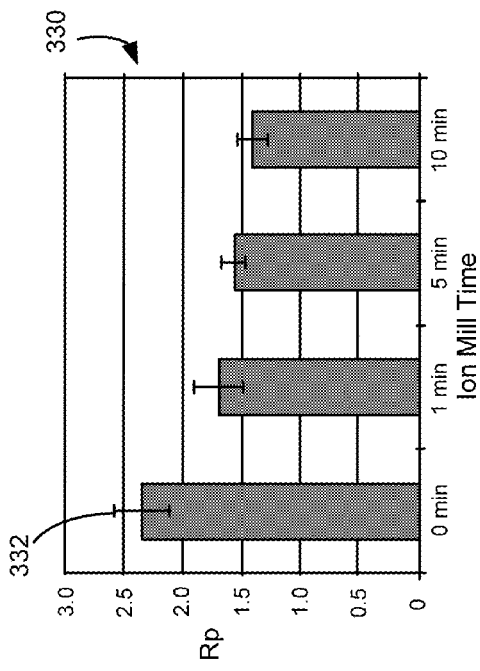
FIG. 8 is a graph comparing maximum peak height values with ion milling time according to one embodiment.

Referring to the graph 300 of FIG. 5, using atomic force microscopic (AFM) images, a comparison between the surface topography distributions 302, 304 of the ion milled outer surface 28 after 10 minutes and the untreated (e.g., unmilled) outer surface 28, respectively, is shown. The surface topography distributions represent the height and depth of the topographical features on the outer surface 28 versus the number of examined data points in the images. The comparison reveals the surface topography distribution curve 304 for the ion milled outer surface 28 after just 10 minutes was significantly narrower than the curve 302 of the unmilled outer surface.

Further, as shown in the respective graphs 310, 320, 330, 340 of FIGS. 6-9, and based on AFM images obtained at different times (i.e., 0 minutes, 1 minute, 5 minutes, and 10 minutes) during the 10-minute ion milling period, four different surface roughness parameters (i.e., RMS roughness (Rq), mean roughness (Ra), maximum peak height (Rp), and maximum valley depth (Rv)) of the outer surface 28 each progressively decreased with increasing milling time. The values at each of the data acquisition time periods for each surface roughness parameter has a respective margin of error bar 312, 322, 332, 342 indicating the standard deviation of the data points. The RMS roughness (Rq) is the standard deviation of height values within the image. The mean roughness (Ra) is the average of the height deviations measured from a mean plane. According to the comparison, both the maximum peak height (Rp) and maximum valley depth (Rv) decreased by about one nanometer after only 10 minutes of ion milling. The decrease in each of the roughness parameters indicates that the surface of the outer surface 28 of the magnetic layer 24 is smoother after 1 minute and 5 minutes of ion mill time, and significantly smoother after 10 minutes of ion mill time. In other words, the graphs 310, 320, 330, 340 indicate that the surface roughness of the magnetic layer progressively decreases with increased mill time. However, the rate of surface roughness reduction decreases with increased mill time, which suggests that at some mill time threshold, the rate of surface roughness reduction is approximately zero, and in some instances may actually start to increase. Accordingly, the apparatus 10 may be configured to ion mill the magnetic layer up until a mill time threshold is met to maintain a high ion milling efficiency (e.g., stop ion milling once the surface roughness reduction rate is negligible, which can reduce unnecessary expenses and time) and to avoid increasing the surface roughness of the magnetic layer.

Figure 10:
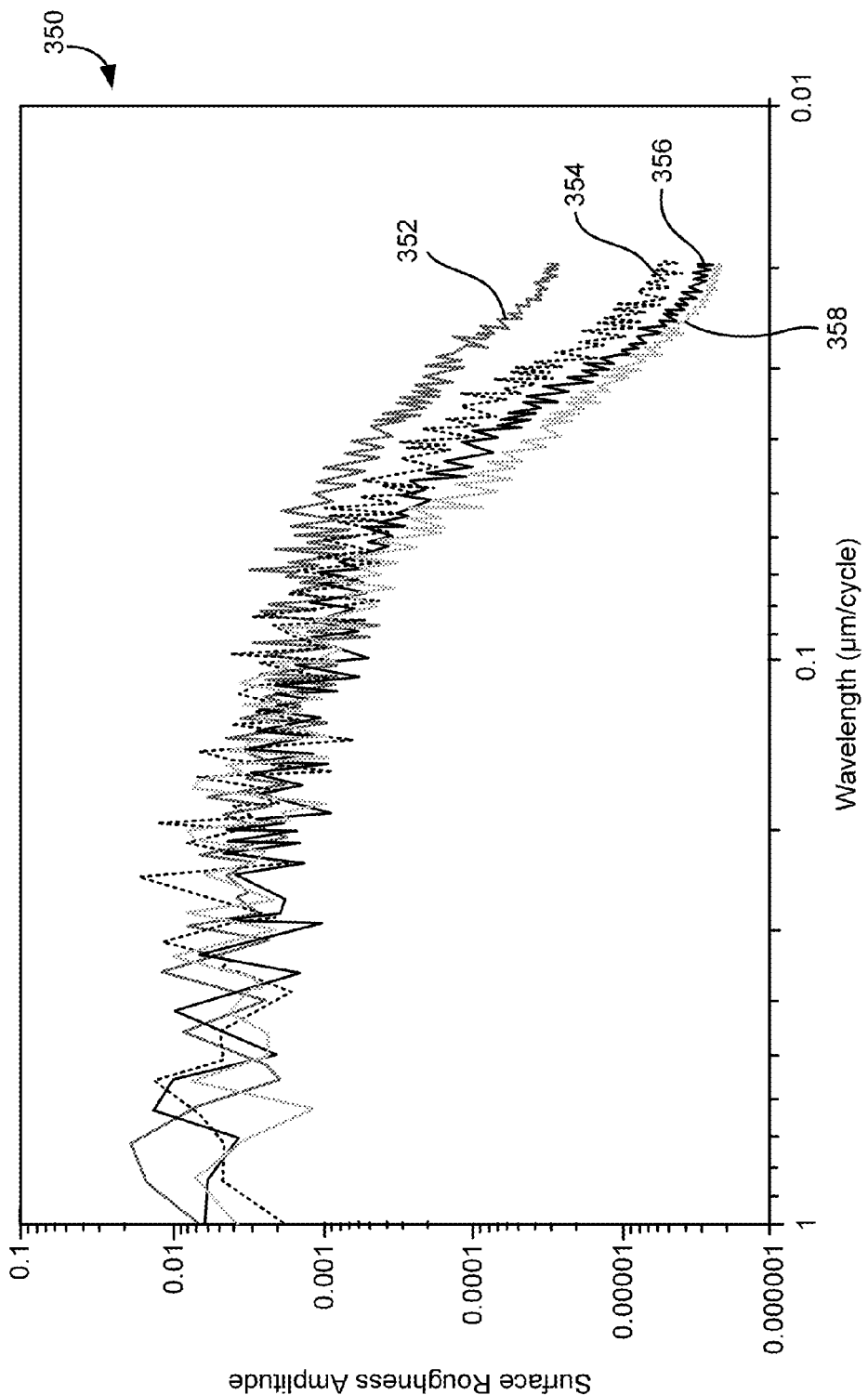
FIG. 10 is a graph comparing surface roughness amplitude values with spatial wavelengths of roughness features on a surface according to one embodiment.

Referring to the graph 350 of FIG. 10, through power spectral density (PSD) analysis, the same AFM images were used to determine the length scale of the smoothing effects on the outer surface 28 of the magnetic layer 24 over the designated milling time period. Generally, PSD is a representation of the roughness amplitude (in units of $nm^3$) as a function of the spatial wavelength of roughness features present on the outer surface (in units of µm/cycle). The PSD is related to the RMS roughness as the RMS roughness is equal to the square root of the integral of the PSD over all wavelength intervals. As shown in the graph 350, the surface roughness amplitude of the features on the outer surface 28 decreases dramatically for features with spatial wavelengths of about 60 nm or less. Additionally indicated is the significant decrease in surface roughness amplitude for features with spatial wavelengths of 60 nm or less after even after a small amount of ion milling at a shallow grazing angle β. For example, after one minute of ion milling at a shallow grazing angle β, the surface roughness amplitude 354 for features of about 60 nm or less on the outer surface 28 is significantly less than the surface roughness amplitude 352 of the same features on the outer surface prior to ion milling. Similarly, after five minutes of ion milling at the shallow grazing angle β, the surface roughness amplitude 356 is less than the surface roughness amplitude 354 after one minute of ion milling, albeit not as dramatic as the decrease from the surface roughness amplitude 352 to the surface roughness amplitude 354. Likewise, after ten minutes of ion milling at the shallow grazing angle β, the surface roughness amplitude 358 is less than the surface roughness amplitude 356 after five minutes of ion milling.

Figure 2:
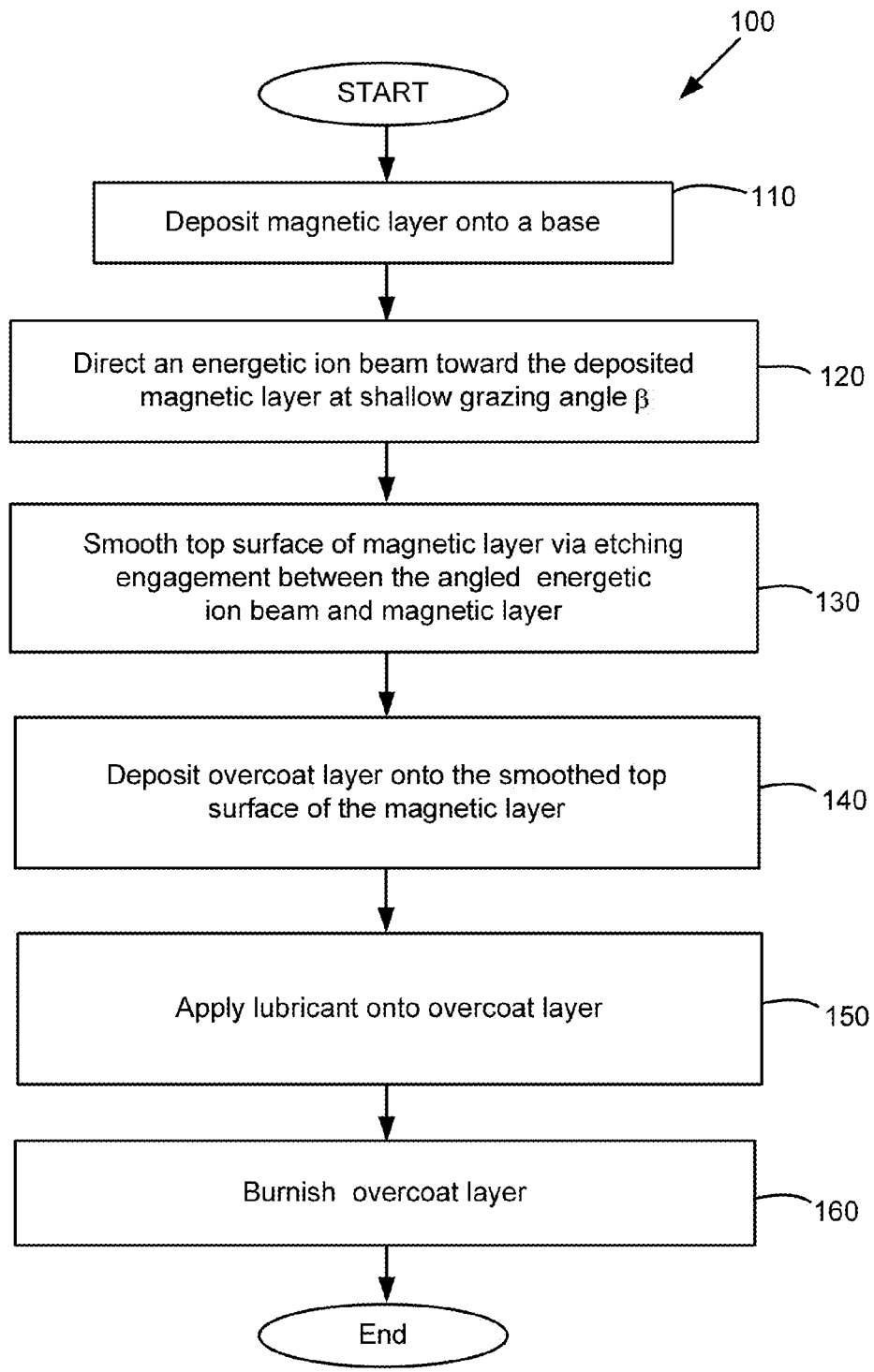
FIG. 2 is a flow diagram illustrating one embodiment of a method for smoothing a surface of a magnetic layer of a magnetic recording medium.

According to one embodiment shown in FIG. 2, a method 100 for smoothing a magnetic layer of a patterned magnetic medium includes providing a base, which includes a substrate, and depositing a magnetic layer onto the base at 110. The magnetic layer can be patterned into a plurality of discrete bits or non-patterned. The method 100 further includes directing an energetic ion beam toward the deposited magnetic layer at a shallow grazing angle β at 120. Associated with directing the ion beam toward the deposited magnetic layer, the method 100 includes at 130 smoothing a top or outer surface of the deposited magnetic layer via etching engagement between the angled energetic ion beam and magnetic layer. Etching engagement is facilitated by directing the energetic ion beam into contact with the outer surface of the magnetic layer. The physical bombardment of energetic ions into the outer surface of the magnetic layer at a shallow grazing angle β dislodges material from the peaks of the outer surface, which effectively reduces the surface roughness of the outer surface. In certain implementations, smoothing of the outer surface of the magnetic layer includes selecting an appropriate grazing angle β, etching time period, ion species, and/or ion energy level to effectuate a desired final surface roughness of the outer surface. One or more of the grazing angle β, etching time period, ion species, and ion energy level may be selected based on desirable ion milling efficiencies and/or manufacturing constraints.

Following smoothing of the outer surface of the magnetic layer at 130, the method 100 includes depositing an overcoat layer onto the smoothed top surface of the magnetic layer at 140. Because the top surface of the magnetic layer is smoothed, the top surface of the overcoat layer is correspondingly smooth, and the thickness of the overcoat layer is more uniform due to a more uniform coverage of the overcoat layer over the magnetic layer. After depositing the overcoat layer onto the magnetic layer at 140, a lubricant is applied to the outer surface of the overcoat layer at 150 and the outer surface of the overcoat layer is burnished at 160. In one implementation, the lubricant application process at 150 includes dipping the medium in a lubricant solution bath. In another implementation, the lubricant application process at 150 includes depositing a lubricant onto the overcoat layer using a vapor lubricant deposition technique, or other lubricant deposition technique known in the art. Because the burnishing process at 160 occurs after the magnetic layer is smoothed and deposition of a correspondingly smooth overcoat layer, the burnishing process does not scratch or induce corrosion of the overcoat layer commonly associated with conventional patterned magnetic media with higher surface roughness.

To achieve at least one of the above-discussed benefits of forming an overcoat or protective layer with a smoother outer surface, in addition or as an alternative to first reducing the roughness of the outer surface of the magnetic layer as discussed above in relation to FIGS. 1 and 2, the surface roughness of the overcoat layer can be reduced directly by ion milling the overcoat layer at a shallow grazing angle. Referring to FIG. 3, the apparatus 10 can be configured to smooth an outer surface 42 of an overcoat or protective layer 40 after the overcoat layer is deposited on the magnetic layer 24 of a patterned magnetic medium 20. The magnetic layer 24 can be deposited on a base layer 22 and have a magnetic bit pattern formed therein as discussed above. The same or different ion beam gun 12 can be used to generate an ion beam 50 of energized ions 52 channeled in a desired direction relative to the outer surface 42 of the overcoat layer 40. Similar to the ion beam 14, the ion beam 50 also is directed toward the overcoat layer 40 at a grazing angle β defined between the ion beam 50 and the macro-scale outer surface 42 of the overcoat layer.

Similar to smoothing the magnetic layer 24, the apparatus 10 smoothes the outer surface 42 of the overcoat layer 40 by shooting the ion beam 50 at the overcoat layer 42 at a designated grazing angle β for a designated time period Like the ion beam 14, the ion beam 50 generated by the ion beam generator 12 is made up of a plurality of energized ions 52 of a selected species and energy. One or more of the species of the energized ions 52, energy of ions 52, designated grazing angle β of the ion beam 50, and designated time period for shooting the ion beam 50 can be the same as or different than the respective corresponding characteristics associated with the ion beam 14 used to smooth the magnetic layer 24 as discussed above. In some implementations, the characteristics of the ion beam 50 for smoothing the overcoat layer 40 are the same as those of the ion beam 14 for smoothing the magnetic layer 24, such as when the surface roughness of the overcoat layer before ion milling is similar to the surface roughness of the magnetic layer before ion milling, or the desired ion milling efficiency for smoothing the overcoat layer is similar to the desired ion milling efficiency for smoothing the magnetic layer. In other implementations, one or more of the characteristics of the ion beam 50 for smoothing the overcoat layer 40 are different than those of the ion beam 14 are different for smoothing the magnetic layer 24, such as when the surface roughness of the overcoat layer before ion milling is significantly different than the surface roughness of the magnetic layer before ion milling, or the desired ion milling efficiency for smoothing the overcoat layer is different than the magnetic layer (e.g., due to differences in material types of atomic densities).

The apparatus 10 can be adjustable to adjust the characteristics of the ion beam 50 in the same or similar manner as discussed above for the ion beam 14. Likewise, a control module can be configured to automatically determine the characteristics of the ion beam 50 based on user input and set the apparatus 10 to produce an ion beam 50 corresponding to the determined characteristics. In some implementations, the apparatus 10 can be adjusted in-situ between a first mode for generating a desired ion beam 14 for smoothing a magnetic layer and a second mode for generating a desired ion beam 50 for smoothing an overcoat layer. Adjustment between the first and second mode can be controlled by a control module. Switching between the first and second modes may be based on switching between two different mediums. Alternatively, switching between the first and second modes may be based on completing a smoothing process on the magnetic layer of a medium and initiating a smoothing process on the overcoat layer of the same medium (after the overcoat layer is applied to the magnetic layer in an intermediate step).

Figure 4:
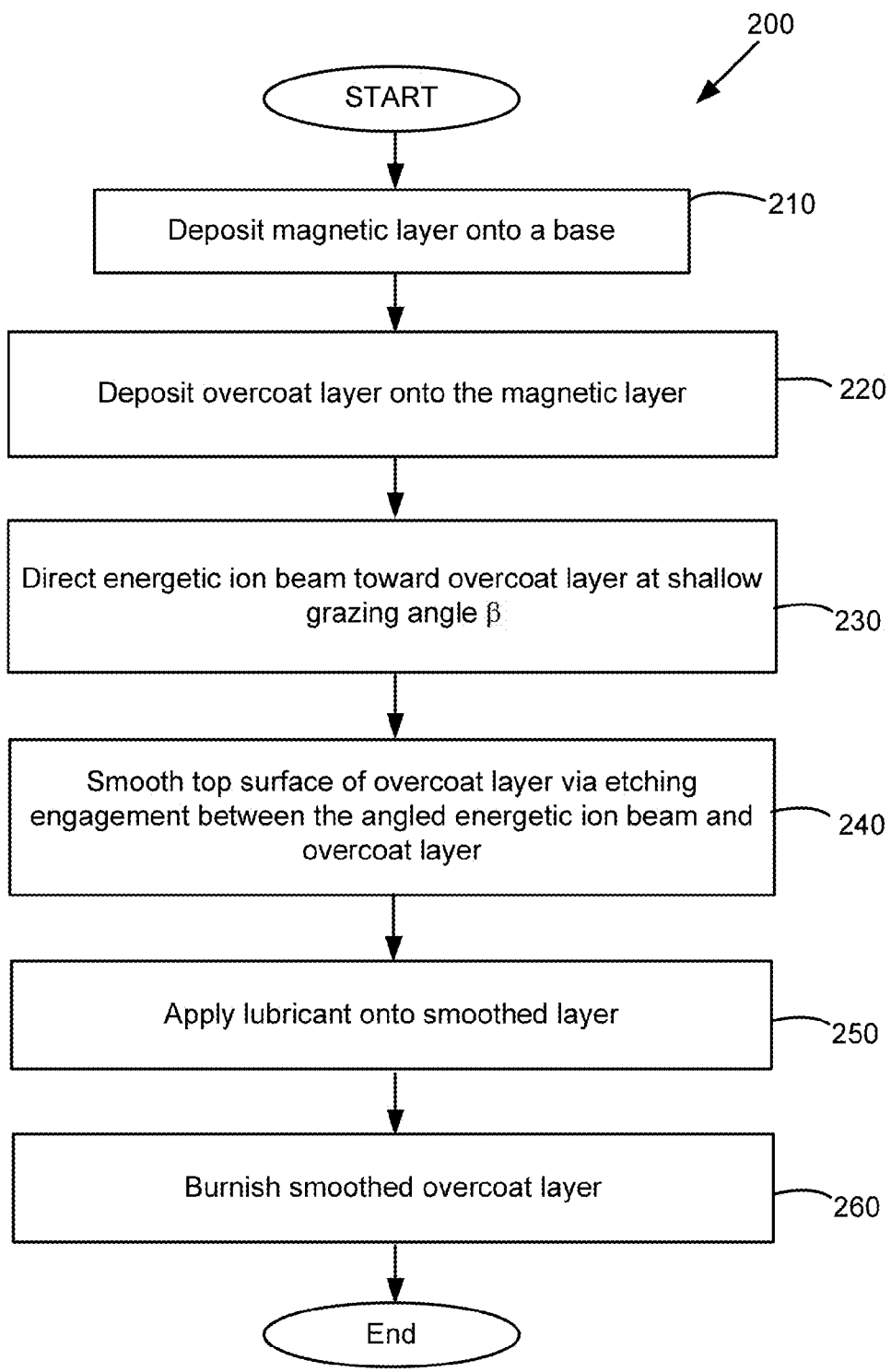
FIG. 4 is a flow diagram illustrating one embodiment of a method for smoothing a surface of an overcoat layer of a magnetic recording medium.

According to another embodiment shown in FIG. 4, a method 200 for smoothing an overcoat layer of a patterned magnetic medium includes providing a base and depositing a patterned or non-patterned magnetic layer onto the base at 210. The method 200 further includes depositing an overcoat layer onto the magnetic layer at 220. Then the method 200 includes directing an energetic ion beam toward the deposited overcoat layer at a shallow grazing angle β at 230. The method 200 further includes at 240 smoothing a top surface of the overcoat layer via etching engagement between the angled energetic ion beam and the overcoat layer. Etching engagement is facilitated by directing the energetic ion beam into contact with the outer surface of the overcoat layer. The physical bombardment of energetic ions into the outer surface of the overcoat layer at a shallow grazing angle β dislodges material from the peaks of the outer surface, which effectively reduces the surface roughness of the outer surface.

In certain implementations, smoothing of the outer surface of the overcoat layer includes selecting an appropriate grazing angle β, etching time period, ion species, and/or ion energy level to effectuate a desired final surface roughness of the outer surface. One or more of the grazing angle β, etching time period, ion species, and ion energy level may be selected based on desirable ion milling efficiencies and/or manufacturing constraints. Finally, the method 200 includes applying a lubricant to the outer surface of the overcoat layer at 150 and burnishing the smoothed overcoat layer at 250. As discussed above, the lubricant application process at 150 can include dipping the medium in a lubricant solution bath, depositing a lubricant onto the overcoat layer using a vapor lubricant deposition technique, or other lubrication application process known in the art.

In some implementations, the outer surface 28 of the magnetic layer 24 may be smoothed (e.g., ion milled) as discussed above in associated with FIGS. 1 and 2 before the deposition and smoothing of the overcoat layer 40. Accordingly, although not shown in FIG. 4, the method 200 may include the performance of the actions 120, 130 of the method 100 after depositing the magnetic layer at 210 and before directing the energetic ion beam toward the overcoat layer at 230 of the method 200. Smoothing the magnetic layer 24 prior to depositing the overcoat layer 40 can improve the coverage, thickness uniformity, and surface roughness of the overcoat layer even before the overcoat layer is smoothed. Alternatively, such as in the embodiment shown in FIG. 4, the outer surface 48 of the magnetic layer 24 may not smoothed prior to depositing and smoothing the overcoat layer 40.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The schematic flow chart diagrams and method schematic diagrams described above are generally set forth as logical flow chart diagrams. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for smoothing a magnetic recording medium, comprising:

depositing a magnetic layer onto a base;

depositing an overcoat layer onto an outer surface of the magnetic layer, wherein the overcoat layer completely covers the entire outer surface of the magnetic layer wherein the outer surface comprises a plurality of surfaces which are not parallel to the base; and improving thickness uniformity of the overcoat layer, wherein improving the thickness uniformity of the overcoat layer comprises:

before depositing the overcoat layer, smoothing the outer surface of the magnetic layer by directing a first ion beam comprised of first energetic ions toward the outer surface of the magnetic layer at a first acute grazing angle that is between about 1° and about 35° and smoothing the outer surface of the magnetic layer via etching engagement between the first ion beam and the outer surface of the magnetic layer; and after depositing the overcoat layer, dislodging material from an outer surface of the overcoat layer until a thickness of the overcoat layer is constant across the entire overcoat layer, wherein dislodging material comprises at least one of (i) burnishing the outer surface of the overcoat layer; and (ii) directing a second ion beam comprised of second energetic ions toward the outer surface of the overcoat layer at a second acute grazing angle that is between about 1° and about 35° and smoothing the outer surface of the overcoat layer via etching engagement between the second angled ion beam and the outer surface of the overcoat layer;

wherein after improving the thickness uniformity of the overcoat layer, the overcoat layer remains completely covering the entire outer surface of the magnetic layer.

2. The method of claim 1, wherein the method comprises directing the first ion beam comprised of first energetic ions toward the outer surface of the magnetic layer at the first acute grazing angle and smoothing the outer surface of the magnetic layer via etching engagement between the first angled ion beam and the outer surface of the magnetic layer.

3. The method of claim 1, wherein burnishing the outer surface of the overcoat layer occurs after the at least one of (i) directing the first ion beam comprised of first energetic ions toward the outer surface of the magnetic layer at the first acute grazing angle and smoothing the outer surface of the magnetic layer via etching engagement between the first angled ion beam and the outer surface of the magnetic layer; and (ii) directing the second ion beam comprised of second energetic ions toward the outer surface of the overcoat layer at the second acute grazing angle and smoothing the outer surface of the overcoat layer via etching engagement between the second angled ion beam and the outer surface of the overcoat layer.

4. The method of claim 1, wherein each of the first and second acute grazing angles is between about 10° and about 20°.

5. The method of claim 1, wherein the first acute grazing angle is different than the second acute grazing angle.

6. The method of claim 1, wherein each of the first and second energetic ions are energized to between about 100 eV and about 3,000 eV.

7. The method of claim 6, wherein the energy of the first energetic ions is different than the energy of the second energetic ions.

8. The method of claim 1, wherein the first ion beam is directed toward the outer surface of the magnetic layer for a first time period and the second ion beam is directed toward the outer surface of the overcoat layer for a second time period, and wherein each of the first and second time periods is between about one and ten minutes.

9. The method of claim 8, wherein the first time period is different than the second time period.

10. The method of claim 1, wherein depositing a magnetic layer onto the base comprises forming a perpendicular magnetic recording bit pattern in the magnetic layer.

\* \* \* \* \*